Patented Dec. 22, 1936

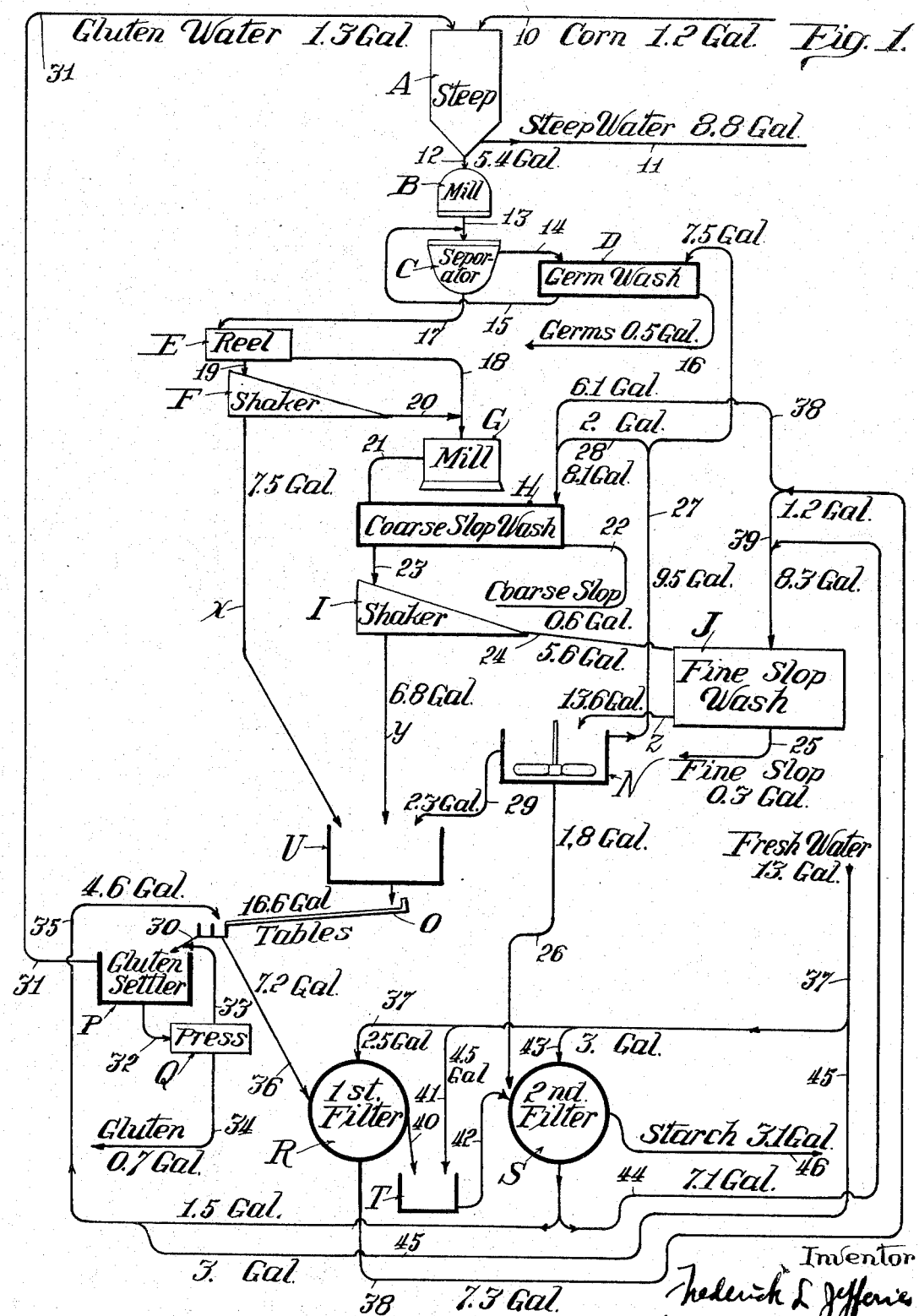

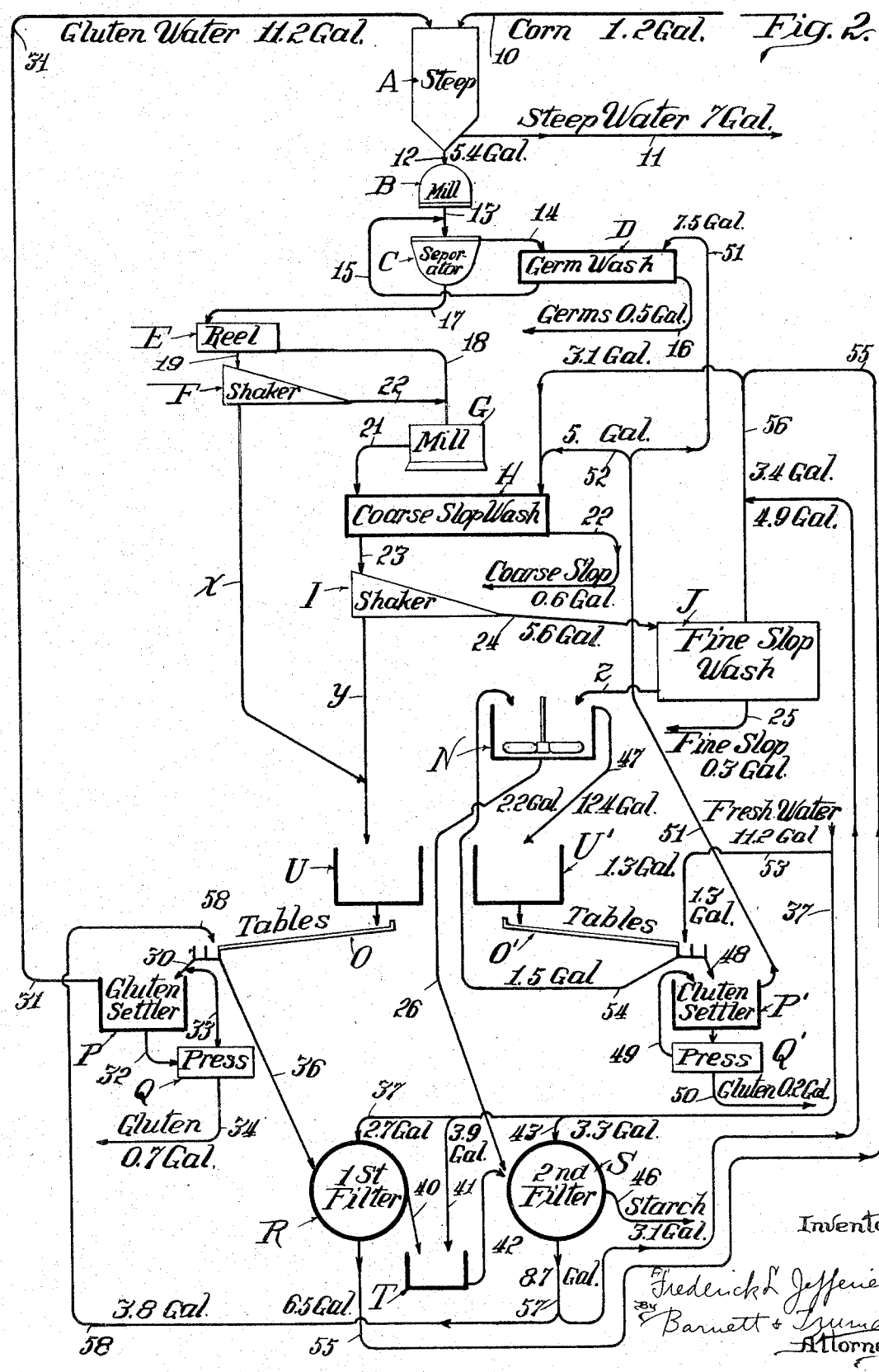

2,065,313

UNITED STATES PATENT OFFICE 2,065,313

STARCH MAKING SYSTEM

Frederick L. Jefferies, La Grange, Ill., assignor to International Patents Development Company, Wilmington, Del., a corporation of Delaware Application April 26, 1933, Serial No. 668,097

16 Claims. (Cl. 127—69)

This invention relates to the manufacture of starch from corn by the "wet" method in which, according to common practice, the corn after being steeped in water containing sulphur dioxide, is subjected to separating operations in water for removal of the germ, bran or hull and fiber, the process at this stage, (the wet starch system) being divided, commonly, into three operations called germ, coarse slop and fine slop separations, after which the resultant mixtures of starch, gluten and water, (mill starch) are combined and run through shallow, slightly inclined troughs (starch tables), or otherwise treated for the separation of the gluten and bulk of the water from the starch; the starch remaining on the tables and the gluten water tailing off therefrom. This tabling operation is followed, ordinarily, by settling the gluten out of the table effluent in vats (gluten settlers). The starch is removed from the tables, for example, by flushing with water, and may be subjected to one or more washing operations usually in vacuum or pressure filters of the displacement type. The mill starch stream, made up of the three streams from the separating operations above referred to, has had, ordinarily, a density at the tableheads between 5° and 7° Baumé.

It has been customary to use a minor portion of the water from the gluten settlers (gluten water, which liquid contains relatively large quantities of corn solubles, micro-organisms and other impurities, for steeping the corn, and to draw off the steep water and evaporate it for the purpose of saving the soluble substances of the corn therein which have considerable value. The amount of gluten water which can thus be used for steeping is limited, for economic reasons, by the cost of evaporation of the steep water which, if too dilute, will not pay to evaporate. The customary steep water draw-off is about 7 gallons per bushel of corn ground—all water computations referred to herein being upon the basis of bushels of corn ground and treated in the process. A larger steep water draw-off would entail a proportionately higher expense for evaporation; and somewhere a point of maximum practical draw-off is reached, beyond which the cost of evaporation exceeds the value of the evaporated product.

It has also been customary to re-use the rest of the gluten water—the major portion of it— in the wet starch system, that is in the germ, coarse slop and fine slop separations, in the place of fresh water; and to use in the same operations, as make-up water, wash water or filtrate from the starch washing filters; and a starch making system so operated has been called in factory parlance a "bottled-up system." Such a system is disclosed in U. S. patent to Rush O. McCoy No. 1,651,611, patented December 6, 1927.

A "bottled-up system" effects complete saving of the corn substance—soluble and insoluble— in the process waters, economizes water and prevents stream pollution, as no process water need be sent into rivers or lakes via the factory sewers; but the re-use of the gluten water in the wet starch system, forming a part of this process, is objectionable because it takes back into the system the relatively large quantities of soluble substances in the gluten water, together with the micro-organisms and products of micro-organic activity developed in such water in its passage through the various stages of the process and during the period of standing in the gluten settlers, and these non-starch bodies and substances constitute and give rise to impurities in the starch, some of which impurities appear to be of a colloidal character, difficult to remove by washing. The excess of solubles necessarily increases the difficulties of washing and makes repeated filterings of the starch essential even for a fairly high degree of purity.

In a cyclic system involving repeated return of process waters with draw-off from the system at one or more points, it does not follow that any given volume of process water returned to the system, during a given period of time, will all be drawn off during its passage through the system. On the contrary, an indeterminate portion of any given volume of returned process water may be re-circulated, with its solubles, micro-organisms and their products, for an indefinite number of times, and thus a certain number of micro-organisms may remain and thrive in the system for a long period; and this condition necessarily brings about an increased quantity in the starch of such impurities as are the result of micro-organic activity. That is, as in any cyclic system, an indeterminate part of the process water may remain in the system for a long time and thereby increase the infection of the system.

Applications of Frederick L. Jeffries, Serial No. 606,897, filed April 2, 1922 (Patent No. 2,050,330, August 11, 1936), and Serial No. 668,095, filed April 26, 1933, disclose certain improvements upon the starch making system above described whereby all, or substantially all, of the gluten water may be returned to the steeps, none going back to the wet starch system. Contamination of the materials in process in thereby minimized.

These improved processes involve making the separation between starch and gluten, by tabling or equivalent operation, at much higher densities than has been customary. Specifically the improved processes referred to contemplate extraction of water from the mill starch and reuse of the extracted water in the wet starch system.

The present invention in which no claim is made to any invention disclosed in the aforementioned applications 606,897 or 668,095 has for its object certain modified arrangements whereby the same general object—exclusion of the gluten water from the wet starch system—is accomplished by specifically different expedients. The present invention contemplates, specifically, the use in the process of a concentrating device which not only extracts water from the mill starch but which also effects a separation between the starch and the gluten in the mill starch or a portion of the same. This arrangement makes possible a reduction in steep water draw-off, reduction in table equipment and simplification of the process of washing the starch in the starch filters.

A particular object of the present invention, of value regardless of the extent to which process waters are returned for re-use in the process, is to provide certain novel arrangements whereby the tabling or other apparatus for making the separation between the starch and gluten may be reduced and this operation facilitated and the cost of the same lessened.

This object is carried out by subjecting the mill starch, or a portion of the same, to a preliminary separating operation in a settling vessel from which a certain amount of starch may be withdrawn in condition, after the usual washing, for sale or use; after which the rest of the mixture in the settling vessel, consisting of starch, gluten and water, either alone or mixed with mill starch, is subjected to a tabling operation, or its equivalent, for completing the separation of the gluten from the starch. This operation may, under some circumstances, result in too high a gluten content in the starch and in such case the starch may be flushed or otherwise washed from the tables and returned to the process, for example, to the settling vessel, for treatment with the incoming mill starch. Under other conditions the starch will be free enough from gluten so that it may go directly to the washing filters.

The invention is shown in two preferred embodiments in the accompanying drawings, designated Figs. 1 and 2, which are flow sheet diagrams of the improved processes.

The numerals on the drawings followed by the abbreviation "Gal." indicate water content in terms of bushels of corn ground and operated on. By "impurities" are intended all non-starch substances in the material, except the germ, gluten and slop (hull, bran and fiber), and includes corn solubles and other solubles, microorganisms, enzymes and their products, and any residual insolubles and colloidal matter in the process waters and in the starch. By "mill starch" is intended the mixture or mixtures of starch, gluten and water derived from the germ, coarse slop and fine slop separations. By "gluten water" is intended the primary process water containing the largest quantity of impurities, whether this water be removed from the system after settling out of the gluten in gluten settlers or otherwise at that or at an earlier stage of the procedure. Where reels or shakers are shown and referred to as such either type of sieving apparatus may be substituted for the other, or other equivalent separating devices may be used. By "wet starch system" are intended the germ, coarse slop and fine slop separating operations. The starch is shown as flushed from the tables but may be removed by any customary mechanical means. The term "fresh water" is used, necessarily, in a relative sense. All water contains some solubles and impurities. By "fresh water" is intended either water from the service pipes, wells, etc., or process water containing very small quantities of solubles or other impurities in comparison with the quantities of substances in the materials treated by such water. The term "pipe" is intended to include any suitable conduit or conveyor.

Referring first to Fig. 1, A represents one of the steep tanks of the steeping system, this system consisting, ordinarily, of a number of tanks in which the corn is steeped with water containing sulphur dioxide at temperatures ordinarily above room temperature. The steep water is drawn off to evaporators which are not shown. The steeped corn is coarse ground in mill B, the germ separated by flotation from the rest of the material in separator C and washed in germ washing system D, which latter consists of a series of reels and/or shakers. The de-germinated corn is put through a reel E to remove the slop, and the liquid magma passing over E is put through a shaker F to remove the grits, i. e., starch particles; and slop and grits are ground in mill G. The ground material is washed in the coarse slop washing apparatus H consisting of a system of reels and/or shakers operated on the countercurrent principle. The liquid from the coarse slop wash containing starch, gluten and fine bran particles, is passed over a sieve I for intercepting the fine bran particles, which latter are washed in the fine slop washing system J consisting of a series of reels and/or shakers of finer mesh than the sieving devices of the coarse slop wash H.

The mill starch stream in the pipe $x$ is derived from the germ separation and contains the largest quantity of soluble substances as well as the largest quantity of insolubles, starch and glutten. The mill starch in pipe $y$, derived from the coarse slop wash, contains less solubles and insolubles than the stream $x$ but considerably more than the mill starch stream in pipe $z$ which is derived from the fine slop wash. The stream in $z$ is quite dilute. The mill starch of the $z$ stream is run into a concentrating and separating apparatus N of any suitable type, such as a Dorr thickener, which separates some of the starch from the gluten and eliminates some of the water from the gluten-starch mixture. This eliminated water is returned to and re-used in the wet starch system, the starch separated out is sent to the starch filtering system for washing, the mixture of starch and gluten then goes to a mixing vessel U into which the mill starch streams $x$ and $y$ are introduced, and the mixture from the tank U is sent over the starch tables O. The starch settles on the tables O, the gluten and water tails off into the gluten settler T, the gluten from which is pressed in the press Q. The starch removed from tables O is washed first in the filter R and then in the filter S. The starch from the concentrator-separator N is preferably washed only in the second filter S, although this is optional. T is a dilution tank for diluting the starch from filter R before it goes to filter S.

*Operation of process Fig. 1.*—The corn containing 1.2 gallons of water enters the steeping system A at 10 and the steep water, 8.8 gallons, is discharged from the steeping system to the evaporators at 11. The steeped corn, containing 5.4 gallons of water passes through pipe 12 to the mill B and the ground material through pipe 13 to separator C. The germs floated in the separator pass through pipe 14 to the germ wash D, the liquid from which passes back to the separator through pipe 15. The germs containing 0.5 gallon of water are discharged from the system at 16. The degerminated corn passes from the separator C through pipe 17 to reel E, and the slop from reel E goes through pipe 18 to mill G. The liquid from reel E passes through pipe 19 to shaker F, the grits going from the shaker through pipe 20 to mill G. The slop and grits ground in mill G pass through pipe 21 to the coarse slop wash. The coarse slop containing 0.6 gallon of water is discharged from the system at 22. The liquid from the coarse slop wash passes through pipe 23 to shaker I. The fine slop from the shaker I containing 5.6 gallons of water passes through pipe 22 to the fine slop wash J. The fine slop, containing 0.3 gallon of water is discharged from the system at 25.

The mill starch from the fine slop wash containing 13.6 gallons of water passes through pipe z to the separator-concentrator N which classifies the material into, preferably, three strata, starch in the lower part of the apparatus, substantially free from gluten, which, with 1.8 gallons of water passes through pipe 26 to the second filter S; water in the upper part of the apparatus (this may, of course, contain small quantities of starch and gluten) which, to the extent of 9.5 gallons, passes into pipe 27, 7.5 gallons going to the germ wash and 2 gallons going through pipe 28 to the coarse slop wash; and a middle stratum of starch and gluten which is drawn off through pipe 29 to the mixing vessel U, into which are also discharged 7.5 gallons of mill starch from pipe x and 6.8 gallons from pipe y.

The mixture of mill starch in the vessel U, 16.6 gallons in all, is passed over the starch tables O, the water and gluten passing through pipe 30 to the gluten settlers P. The gluten water, 13 gallons, is sent to the steeps through pipe 31. The settled gluten passes through pipe 32 to press Q, the water from the press going through pipe 33 to the gluten settler. The gluten, containing 0.7 gallon of water, is discharged from the system at 34.

The starch flushed from the tables by 4.6 gallons of water delivered through pipe 35 passes through pipe 36, with 7.2 gallons of water to the first filter R. Here it is de-watered and then washed with 2.5 gallons of fresh water from pipe 37. The filtrate from the first filter, 7.3 gallons, passes into pipe 38, 6.1 gallons going into the coarse slop wash and 1.2 gallons through branch pipe 39 to the fine slop wash.

The starch stripped from the filter R passes through pipe 40 to the dilution tank T where it is diluted with 4.5 gallons of water through branch pipe 41 of the fresh water supply pipe 37. The diluted starch passes through pipe 42 to the second filter S where it is de-watered and then washed, (together with the starch from concentrator N through pipe 26) with 3.0 gallons of fresh water through branch pipe 43. 7.1 gallons of the filtrate from the second filter S passes into pipe 44 and thence to the fine slop wash. 1.5 gallons goes into the flushing water pipe 35, above mentioned, being augmented by three gallons of fresh water from the branch pipe 45. The starch is discharged from filter S at 46 and contains 3.1 gallons of water.

The above mentioned water balance figures are merely illustrative and typical. They depend, necessarily, upon the particlar apparatuses employed.

The process of Fig. 2 is the same as that of Fig. 1 as far as the concentrator-separator N; and to this point the elements of the apparatus and their connections are given reference characters corresponding with the reference characters used in Fig. 1. In the Fig. 2 arrangement there are two sets of tables: "high solubles" tables O for tabling the x and y mill house streams from the germ and coarse slop separations and "low solubles" tables O' for tabling the over-flow from the concentrator-separator N. The gluten water from the gluten settler P receiving the effluent from tables O—this being the high solubles process water—is returned to the steeps while the over-flow from the gluten settler P' receiving the effluent from the low solubles tables O'—a liquid having a relatively low solubles content—is re-used in earlier stages of the process.

The washing of the starch is the same as in Fig. 1 (except that the water quantities are preferably adjusted to the different conditions) as indicated on the drawings, and the elements of the washing system and their connections are given the same reference numerals as are used in Fig. 1.

The amount of steep water withdrawn from the steeping system at 11 is reduced to 7 gallons by a reduction of gluten water from settler P through pipe 31 to the steeps to 11.2 gallons. This makes it possible to introduce into the system, through pipe 37, only 11.2 gallons of fresh water as indicated.

The starch separated in the concentrator-separator N passes through pipe 26, with 2.2 gallons of water, to the second filter S. The over-flow from the concentrator-separator N consisting of a very dilute mixture of gluten with some starch in it, 12.4 gallons, passes through pipe 47 to a collecting vessel U' and from this to the low solubles tables O'. The starch settles on the tables and the gluten and water passes through pipe 48 to the gluten settler P'. The gluten from the gluten settler is pressed in the press Q'; the water going back to the gluten settler through pipe 49 and the gluten, containing 0.2 gallon of water, being discharged from the system at 50. The water from the gluten settler P', 12.5 gallons, passes into pipe 51, 7.5 gallons going to the germ wash D and 5.0 gallons going to the coarse slop wash through branch pipe 52.

The starch is flushed from the tables O', with 1.3 gallons of fresh water from branch pipe 53 of the fresh water supply pipe 37; and, as this starch is relatively impure, containing a certain amount of gluten, it is preferably returned, containing 1.5 gallons of water, to the concentrator-separator N through pipe 54; although it could be discharged from the system if the relatively small amount of gluten contained in the starch did not preclude its use for the desired purpose.

In this case the starch could be washed in filters as usual.

The 6.5 gallons of filtrate from the first filter R passes into pipe 55, 3.1 gallons going to the coarse slop wash H and 3.4 gallons through pipe 56 to the fine slop wash J. Of the 8.7 gallons entering pipe 57 from the second filter S, 4.9 gallons goes to the fine slop wash J and 3.8 gallons through pipe 58 to the flushing system for the high solubles tables O.

While the process as disclosed involves no discharge of process waters to the sewer, circumstances might require a discharge to the sewer of a greater or lesser quantity of water; and in this case it would be desirable to discharge some or all of the water from the gluten settler P' as this water is very low in solubles. In such case the amount of fresh water introduced into the system might have to be increased.

It would be understood that both as to the processes of Figs. 1 and 2, the water balance quantities can be varied considerably and would probably have to be varied for different installations, and possibly for different qualities of corn handled. Such modifications are contemplated by this invention, and the intention is to cover all variants within the scope of the appended claims.

I claim:

1. In the process of obtaining starch from corn: separating from the ground corn in water a mixture of starch, gluten and water; bringing about a separation in a settling vessel of some of the starch in said mixture; tabling the residue to eliminate the gluten from the starch; flushing the starch from the tables; and returning the flushed starch to said settling vessel.

2. In the process of obtaining starch from corn: separating from the ground corn in water a mixture of starch, gluten and water; bringing about a separation in a settling vessel of some of the starch in said mixture; tabling the residue of the mixture to eliminate some of the gluten from the starch; removing the starch with its residual gluten from the tables; and returning such starch to the process for further separation of gluten therefrom.

3. In the process of obtaining starch from corn comprising tabling mill starch to separate the gluten therefrom: the improvement which consists in bringing about a settling out of some of the starch from the mill starch in a settling vessel; subjecting the residue to the tabling operation; flushing the starch from the tables; and returning the flushed starch to the settling vessel.

4. In the process of obtaining starch from corn in which the corn, in a comminuted state, is subjected to separating operations yielding a water mixture of starch and gluten the improvement which consists in subjecting said water mixture of starch and gluten to an operation which separates therefrom part of the starch substantially free from gluten and in a concentrated but fluent state; returning and re-using in said separating operations on subsequently treated comminuted corn a dilute mixture of water and solids derived from the separating operation performed on said water mixture; and subjecting the rest of the starch and gluten mixture to a separating operation for removing the gluten.

5. In the process of obtaining starch from corn the improvement which consists in subjecting mill starch to an operation which divides the same into (1) starch substantially free from gluten, (2) a dilute mixture of gluten, water and starch, and (3) water containing a small quantity of solids; re-using in the process said water; and separately treating the starch and gluten mixture to separate the gluten from the starch.

6. In the process of obtaining starch from corn the improvement which consists in subjecting mill starch to an operation which divides the same into (1) starch substantially free from gluten, (2) a dilute mixture of gluten, water and starch and (3) water containing some solids; re-using said water in the process; separately treating the starch and gluten mixture to separate the gluten from the starch; and filtering the starch from both said operations for removing the solubles therefrom.

7. In the process of obtaining starch from corn comprising subjecting the corn in a comminuted state in water to germ, coarse slop and fine slop separating operations: the improvement which consists in subjecting the mill starch from the fine slop separation to an operation which separates out some of the starch, substantially free from gluten, and separately eliminates a mixture containing the bulk of the gluten, some starch and water, and also water containing small quantities of solids; mixing the starch and gluten mixture from said operation with the mill starch from the germ and coarse slop separations; treating the mixture to separate the gluten from the starch; and returning the water derived from the aforesaid operation to and re-using it in the process.

8. In the process of obtaining starch from corn comprising steeping the corn and subjecting it in a comminuted state in water to germ, coarse slop and fine slop separations: the improvement which consists in treating the mill starch from the fine slop separation to separate the same into (1) starch, (2) a mixture containing the bulk of the gluten, some starch and water, and (3) water containing small quantities of solids; returning the said water to the process for re-use; incorporating the starch and gluten mixture with the mill starch from the germ and coarse slop separations; and treating this mixture to separate the starch and gluten; returning the gluten water to and re-using it in the steeping operation; washing with fresh water the starch recovered in the aforesaid operations; and re-using the starch wash water in the process.

9. In the process of obtaining starch from corn: the improvement which consists in subjecting mill starch to an operation for recovering a portion of the starch substantially free from gluten; separately treating the residue to extract gluten therefrom; diluting with water the starch material derived from the last mentioned operation; and mixing the diluted starch with fresh mill starch as the process proceeds for treatment as aforesaid.

10. In the process of obtaining starch from corn: the improvement which consists in subjecting mill starch to an operation for removal therefrom of some of the starch substantially free from gluten; tabling the residue to remove gluten; flushing the tabled starch; and mixing the flushed starch with mill starch to be treated as aforesaid.

11. In the process of obtaining starch from corn comprising subjecting the corn in a comminuted state in water to germ, coarse slop and fine slop separation operations: the improvement which consists in treating a mill starch from the fine slop separation in a settling vessel to recover some of the starch therefrom; tabling the rest of this mill starch; flushing the starch from the tables; and mixing the flushed starch with mill starch to be treated as aforesaid.

12. In the process of obtaining starch from corn comprising steeping the corn and subjecting it in a comminuted state in water to germ, coarse slop and fine slop separations: the improvement which consists in subjecting the mill starch from the fine slop separation to a settling operation for removal of some of the starch substantially free from gluten; tabling the rest of such mill starch; flushing the tabled starch and mixing it with mill starch for treatment as aforesaid; tabling the mill starch from the germ and coarse slop separations; re-using the gluten water from the last named tabling operation for steeping corn; washing the starch and re-using the starch wash water in the process.

13. In the process of manufacturing starch from corn comprising steeping the corn, comminuting the steeped corn, subjecting the comminuted corn to separating operations in water yielding mixtures of starch, gluten and water having different solubles contents: the improvement which consists in removing starch and gluten from the mixture of starch, gluten and water having the higher solubles content and re-using water from said mixture for steeping corn; subjecting the mixture of lower solubles content to an operation which removes therefrom starch, substantially free from gluten, and water, substantially free from solids; and re-using the water from said last named mixture for said separating operations.

14. In the process of manufacturing starch from corn comprising steeping the corn, comminuting the steeped corn, subjecting the comminuted corn to germ, coarse slop and fine slop separations in water, yielding separate mill starch streams: the improvement which consists in subjecting the mill starch from the fine slop separation to an operation which removes therefrom starch, substantially free from gluten, and water, substantially free from solids; re-using the water from the mill starch derived from the fine slop separation for separating operations on subsequently treated comminuted corn and re-using water from the rest of the mill starch, after removal of the starch and gluten therefrom, for steeping corn as the process is continued.

15. In the process of manufacturing starch from corn comprising steeping and comminuting the corn, subjecting it to separating operations in water, treating the mill starch from the separating operations to recover starch and gluten, and re-using water from the mill starch in the process: the improvement which consists in extracting water from the mill starch before it is treated for the recovery of starch and gluten, and by the same operation removing from it some of its starch, substantially free from gluten; re-using the water thus extracted in separating operations on subsequently treated comminuted corn; and using the water left after the recovery of the starch and gluten from the mill starch for steeping corn.

16. In the process of manufacturing starch from corn comprising steeping and comminuting the corn, subjecting it to germ, coarse slop and fine slop separations, treating the mill starch from the separating operations to recover starch and gluten, and re-using the water from the mill starch in the process: the improvement which consists in extracting water from the fine slop mill starch and by the same operation removing from it some of its starch, substantially free from gluten; re-using the water thus extracted from the fine slop mill starch for separating operations on subsequently treated comminuted corn; and using the water left after recovery of starch and gluten from the mill starch for steeping corn as the process is continued.

FREDERICK L. JEFFERIES.